July 22, 1924.
L. LINK
1,502,507
FIELD IMPLEMENT
Filed Aug. 6, 1923    4 Sheets-Sheet 3
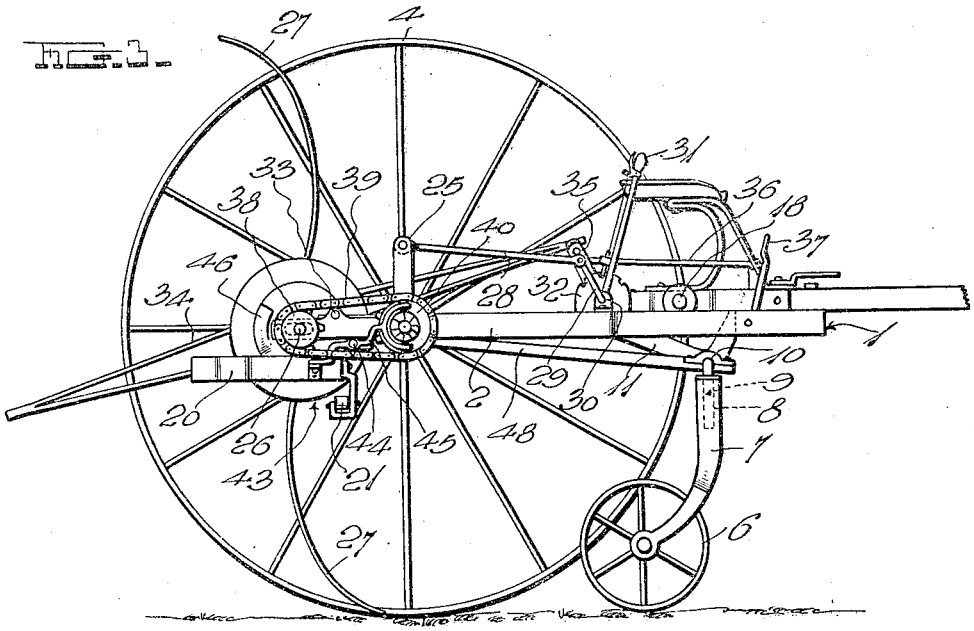
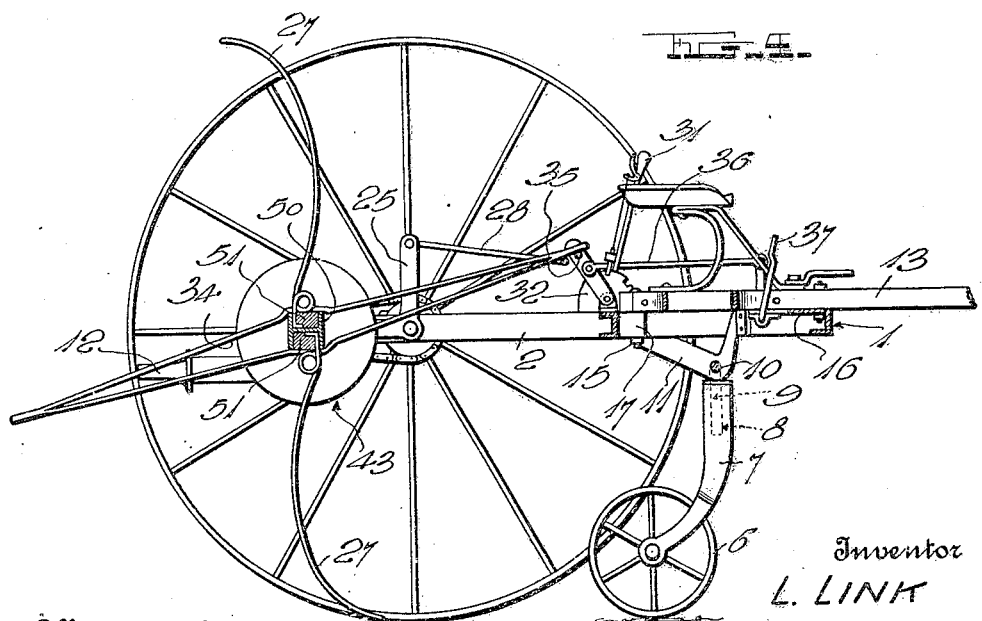
Inventor
L. LINK
Witness
H. Woodard
By H. R. Wilson &co.
Attorneys July 22, 1924.  1,502,507
L. LINK
FIELD IMPLEMENT
Filed Aug. 6, 1923  4 Sheets-Sheet 4
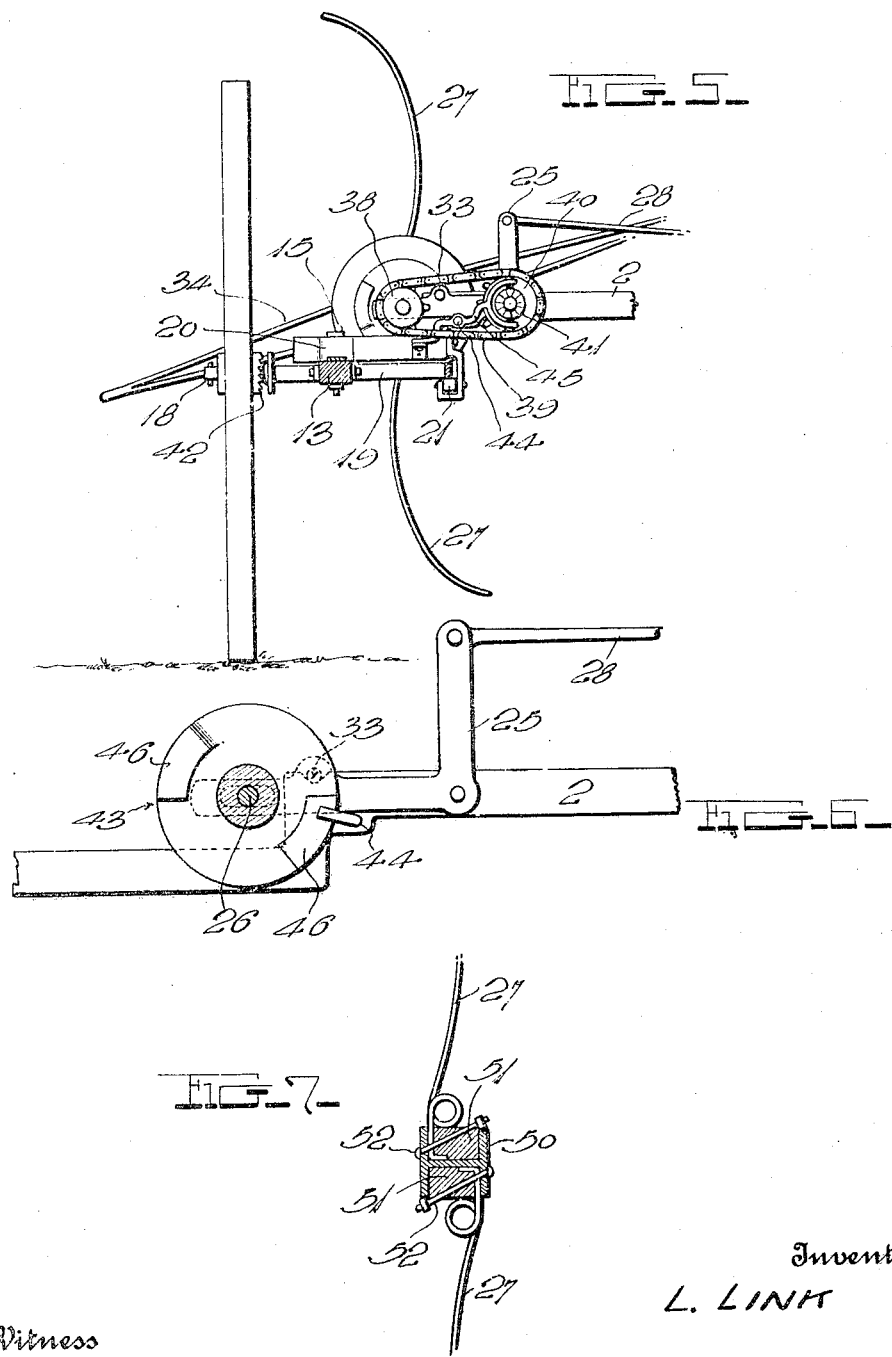

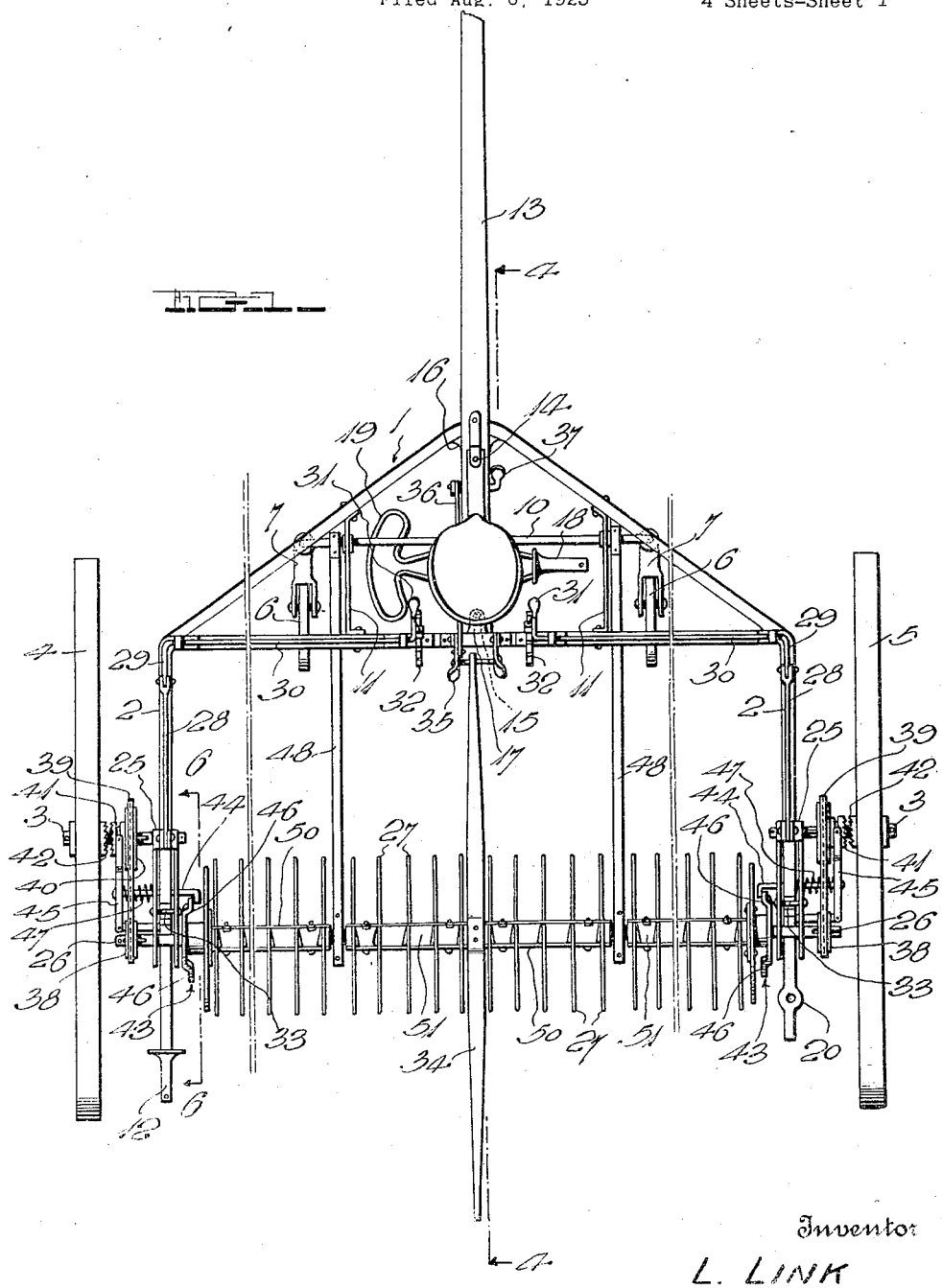

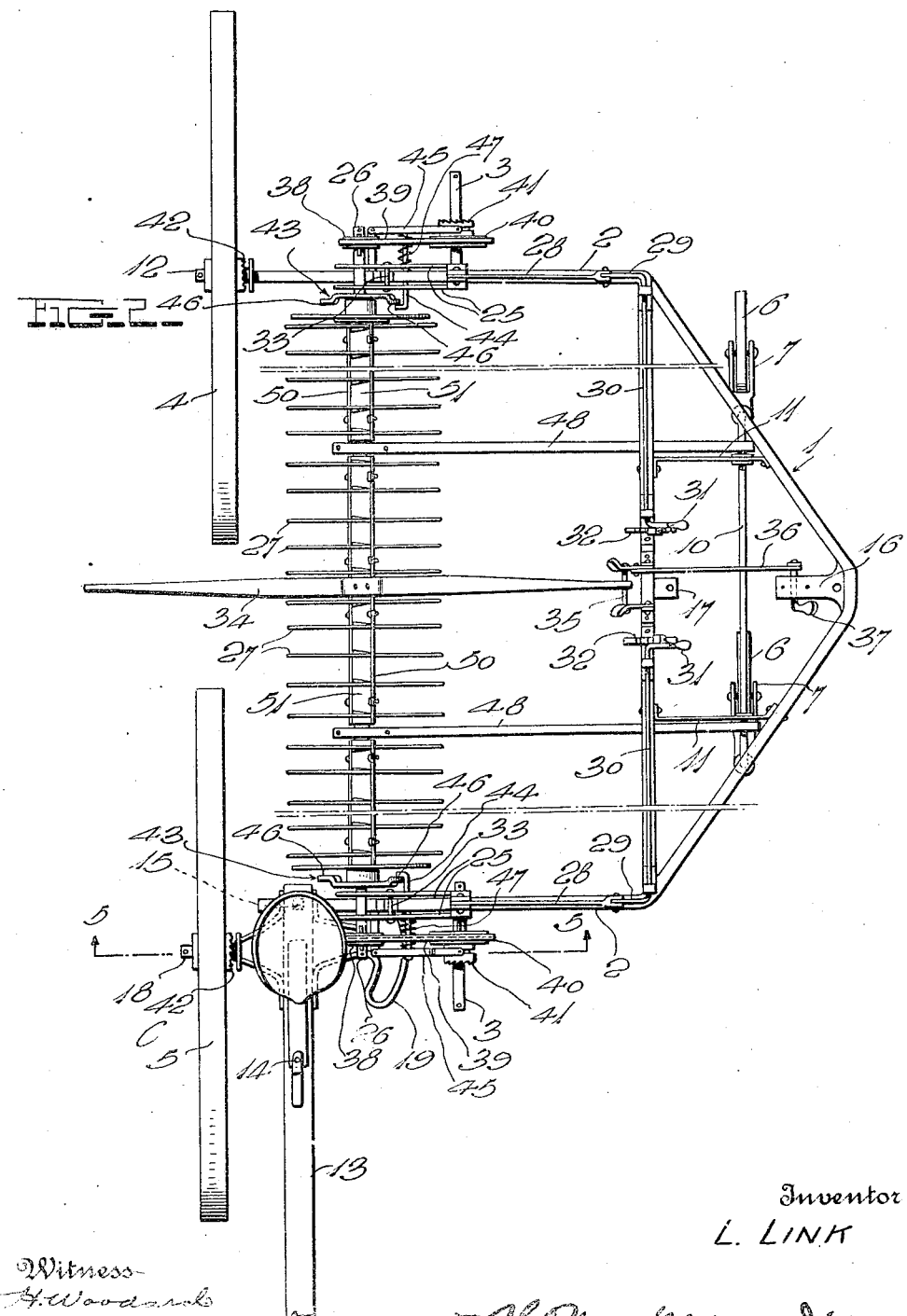

Patented July 22, 1924.

1,502,507

UNITED STATES PATENT OFFICE.

LEWIS LINK, OF COTTONWOOD FALLS, KANSAS.

FIELD IMPLEMENT.

Application filed August 6, 1923. Serial No. 656,073.

*To all whom it may concern:*

Be it known that I, LEWIS LINK, a citizen of the United States, residing at Cottonwood Falls, in the county of Chase and State of Kansas, have invented certain new and useful Improvements in Field Implements; and I do declare the following to be a full, clear, and exact description of the invention, such as will enable others skilled in the art to which it appertains to make and use the same.

My invention relates to field rakes, tedders, and like implements which are of such width that they cannot readily be drawn along a highway, or through gates, when moving them from one place to another. It is the principal object of the invention to provide a novel construction and arrangement of parts which will permit the supporting wheels and tongue or other draft device, to be mounted in positions at right angles to their normal operative positions, thus permitting the machine to be easily drawn from one place to another, without occupying an unusual amount of space.

A further object of the invention is to provide a novel association of parts for completely inverting the rake of a field rake, when the dumping operation starts, bringing a second set of teeth into play.

A still further object is to provide novel mounting means for the end of the tooth carrying shaft of the rake, permitting said shaft to be raised or lowered at either or both ends, as occasion may require to bring the teeth into close engagement with the ground or into other desired relation therewith.

With the foregoing in view, the invention resides in the novel subject matter hereinafter described and claimed, the description being supplemented by the accompanying drawings.

Figure 1 is a plan view of a field rake embodying my improvements, the wheels and tongue being operatively positioned.

Fig. 2 is a view similar to Fig. 1 but illustrating the wheels and tongue in position for drawing the machine from one place to another.

Fig. 3 is a side elevation with one wheel removed.

Fig. 4 is a longitudinal sectional view as indicated by line 4—4 of Fig. 1.

Fig. 5 is a longitudinal sectional view on line 5—5 of Fig. 2.

Fig. 6 is a detail section on line 6—6 of Fig. 1.

Fig. 7 is a detail vertical section illustrating the preferred manner of mounting the rake teeth.

In the drawings above briefly described, the numeral 1 designates a suitable horizontal frame for a field rake, the side bars 2 of said frame being provided with rigid lateral spindles 3 upon which a pair of ground wheels 4 and 5 are removably mounted, said spindles and wheels being disposed adjacent the rear of the frame 1, while its front end is supported upon suitable caster wheels 6 whose carrying forks 7 are preferably formed in their upper ends, with sockets 8. These sockets receive the downturned ends 9 of a transverse shaft 10 which is non-rotatably connected with the frame by suitable brackets 11.

The rear end of one of the side bars 2 is provided with a spindle 12 which is disposed on an axis at right angles to the spindles 3, said spindle 12 being adapted for mounting the wheel 4 when the implement is to be drawn from one place to another (see Fig. 2). When the wheel 4 is mounted in this manner, the other wheel 5 is removed from its spindle 3 and is mounted in the manner described below.

Detachably connected with the front end of the frame 1, I have shown a tongue 13 and while I have hereinafter referred to a tongue only, I wish it understood that a pair of shafts could be well substituted therefor, within the scope of the invention. The tongue is secured to the frame by bolts 14 and 15 which pass through said tongue and through suitable lugs 16 and 17 on the frame. For a purpose to appear, the tongue 13 is provided at one side with a laterally extending spindle 18 and at its opposite side is equipped with a curved horizontal positioned guide track 19.

When the machine is to be conditioned for drawing from one place to another as shown in Fig. 2, the tongue 13 is unbolted from the front end of the frame 1 and by means of the bolt 15, is pivotally connected to an eye 20 on the rear end of the side bar 2, opposite the spindle 12. The wheel 5 is then placed upon the spindle 18 and the curved track 19 engages with a shoe 21 carried by the frame, as disclosed in Fig. 5. It will thus be seen that the machine may be drawn at right angles to the direction in which it is moved when operated, the wheels 4, 5 and 6 serving to support the entire structure, while steering is permitted by horizontal movement of the tongue 13 and wheel 5, about the bolt 15.

The construction so far described may obviously be used in connection with a hay rake, a tedder, or other machine and hence I do not limit the features above explained, to a rake.

Upon the rear portions of the side bars 2, I have shown a pair of bell cranks 25, each of which is preferably of dual form, the rear ends of these bell cranks being provided with appropriate bearings for a transverse rake shaft 26 having two sets of rake teeth 27. Operating rods 28 lead forwardly from the bell cranks 25 to crank arms 29 on rock shafts 30 mounted on the front end of the frame 1, said rock shafts having individual control levers 31 and suitable means 32 whereby they may be normally locked against movement. It will be seen that by operating the levers 31, the ends of the shaft 26 may be raised or lowered singly or in unison, as occasion may require, thus bringing the teeth 27 into proper relation with the ground. To limit the downward movement of the shaft 26, I prefer to provide the bell cranks 25 with limiting pins 33 to strike the upper edges of the side bars 2.

To hold the shaft 26 and its teeth 27 in position for raking, I provide the center of said shaft with a cross arm 34 whose front end is cooperable with a pivoted abutment 35 on the frame 1, said abutment being linked at 36 to a foot pedal 37, so that it may be released whenever the rake is to be dumped. As soon as the dumping operation starts, driving connections are brought into play between the wheels 4 and 5 and the shaft 26, to rapidly rotate said shaft one-half revolution, bringing the next set of teeth 27 into play.

In the preferred form of the invention, each end of shaft 26 is provided with a sprocket wheel 38 around which a chain 39 passes, said chain being also trained around a sprocket 40 on the spindle 3, which sprocket is provided with a clutch member 41 cooperable with a similar member 42 on the wheel 4—5. As long as the shaft 26 is held against rotation by the arm 34 and abutment 35, the clutch members 41 remain disengaged from the members 42, but provision is made for throwing these clutch members into engagement with each other as soon as rotation of the shaft 26 is permitted by release of the abutment 35.

For performing the last mentioned function, I have shown a double cam 43 on each end of the shaft 26, said cam being cooperable with a lateral arm 44 on a pivoted arm 45 which is operatively associated with the clutch member 41. It will be seen that each of the cams 43 has two raised portions 46 and when the rake is operating, one of these raised portions engages the arm 44 and thus holds the clutch member 41 at this particular side of the machine, out of engagement with the member 42. As soon as the shaft 13 starts to rotate however, the arms 44 of both sides of the machine are released and the clutch members 41 are thrown outwardly under the action of coiled springs 47, thus causing the wheels to rapidly turn the shaft 26 one-half a revolution dumping one set of rake teeth 27 and bringing the other set into operation. By the time the arm 34 has again struck the abutment 35, the previously idle portions 46 of the cams 43, engage the arms 44 and throw the clutches out of operation.

To prevent the possibility of the shaft 26 bowing rearwardly, and to take strain from the bell cranks 25, I prefer to provide a pair of longitudinal draw bars 48 connected at their rear ends to said shaft and at their front ends with the shaft 10.

In the preferred form of construction, the shaft 26 includes a plurality of I-beam sections 50 and the inner ends of the teeth 27 extend into the opposed channels of these beams, said ends being secured against one side of the channels by wooden bars 51 which are driven tightly into the latter and secured in place by bolts 52.

As excellent results may be obtained from the details disclosed, they may well be followed, but within the scope of the invention as claimed, numerous minor changes may be made.

I claim:—

1. An implement comprising a frame having a pair of spindles and supporting wheels removably mounted thereon, a normally idle spindle carried by said frame at right angles to the aforesaid spindles and adapted for mounting one of said wheels when the implement is to be drawn idly from one place to another, a tongue detchably connected to the frame and having a normally idle laterally extending spindle, and means for connecting said tongue temporarily with the frame in a position at right angles to its normal operative position, the spindle of said tongue being then adapted for mounting the other wheel.

2. A structure as specified in claim 1; said first named normally idle spindle and the point for temporarily connecting the tongue to the frame being located at the rear end of the latter, and caster wheels for supporting the front end of said frame when drawn in either direction.

3. An implement comprising a frame having a pair of spindles and supporting wheels removably mounted thereon, a normally idle spindle carried by said frame at right angles to the aforesaid spindles and adapted for mounting one of said wheels when the implement is to be drawn idly from one place to another, a tongue detachably connected to the frame and having a normally idle laterally extending spindle at one side, and a horizontal track spaced outwardly from its other side, means for pivoting said tongue to the frame in a position at right angles to normal operative position, and a frame-carried shoe for then engaging said track, the spindle of said tongue being adapted for mounting the other supporting wheel of the frame when said tongue is in its temporary position.

4. An implement comprising a wheeled frame, a pair of bell cranks mounted on the frame and having longitudinally disposed arms provided with bearings, means for swinging said bell cranks either singly or collectively to vertically adjust said bearings, a rake carrying shaft rotatable in said bearings, and means for turning said shaft.

5. A field rake comprising a wheeled frame, a rotatable shaft mounted on said frame and having upwardly and downwardly extending sets of rake teeth, releasable means for normally holding said shaft against turning, normally idle means for rotating said shaft a half revolution; and means controlled by initial turning of said shaft for throwing said turning means into play.

6. A field rake comprising a wheeled frame, a rotatable shaft mounted on said frame and having upwardly and downwardly extending sets of rake teeth, means for normally holding said shaft against turning, normally idle means for rotating said shaft, including a clutch, a cam carried by said shaft, and a shoe cooperable with said cam and operatively connected with said clutch, said cam and shoe being operative to throw the clutch into play upon initial turning of the shaft and to again throw said clutch out of action when the shaft has turned a half revolution.

In testimony whereof I have hereunto affixed my signature.

LEWIS LINK.